Oct. 22, 1968  F. D. MOORE  3,406,953

VENTURI-TUBE SCRUBBER

Filed July 11, 1966

INVENTOR.
FRANK D. MOORE
BY
ATTORNEY

United States Patent Office 3,406,953
Patented Oct. 22, 1968

3,406,953
VENTURI-TUBE SCRUBBER
Frank D. Moore, Tallmadge, Ohio, assignor, by mesne assignments, to U.S. Stoneware, Inc., a corporation of Massachusetts
Filed July 11, 1966, Ser. No. 564,220
2 Claims. (Cl. 261—79)

ABSTRACT OF THE DISCLOSURE

The improvement in a Venturi scrubber of positioning a mist spray nozzle at the gas inlet to direct spray at right angles to the direction of gas flow, and a downwardly directed main spray nozzle, positioned to launch a spray from above the stream of gas flowing into the scrubber.

---

This invention relates to a new Venturi-tube scrubber for treating a gas stream with a liquid to separate entrained particles from the stream, and the method of removing entrained matter from such a scrubber. The matter that is removed is referred to herein as an impurity even though it may have substantial value.

To scrub the gas stream, a high-velocity wash liquid is sprayed into it as it is passed down through a Venturi tube. Before meeting the liquid sprayed down through the Venturi tube, a mist of liquid particles is suspended in the gas so that the gas on meeting the wash spray is precharged with suspended liquid particles. If more than one mist spray is used in pre-charging the gas, it is desirable to use the same liquid in each, but this is not necessary. The mist spray need not be identical with the wash spray, but the two must be miscible with one another.

Above the Venturi there is a chamber of circular cross section and the gas stream enters this tangentially. As the stream passes through this chamber it wipes the wall and prevents the deposition of solid matter from the gas stream. The gas stream on leaving this chamber swirls down through the Venturi.

Eddies are formed in any gas stream passing through a Venturi tube. In the scrubber of this invention the gas swirls down through such a tube, all transverse cross sections of which are circular. The Venturi tube converges from above to a narrow restriction and then widens gradually downward to a diameter which is at least substantially 50 percent larger than the diameter of the restriction. The downwardly narrowing portion is generally about one-third the height of the widening portion and its top is substantially the size of its bottom. However, any type of Venturi tube currently used in such scrubbers may be used. Above this top portion the scrubber widens appreciably, usually sharply, to a generally circular chamber somewhat larger in diameter than the top of the Venturi tube. This is provided with a suitable opening for the gas entrance and the entering gas is precharged with the spray of mist before it enters the Venturi tube.

There is a large spray located centrally above the center of the Venturi tube in the roof of the cylindrical top chamber. A high-velocity spray of any design may be used. This wash spray is generally conical and widens, and then is restricted as it passes through the throat of the Venturi tube. The turbulence in the throat redirects the liquid. The spray must be so intense in the throat that it pumps the gas; this action breaks up the spray so that the gas and liquid move as a non-Newtonian fluid from this point.

A bed of packing elements may be located at the bottom of the Venturi tube to assist in further bringing the wash liquid into intimate, turbulent, large-surface contact with the gas.

The mist spray may be supplied just before or after the gas enters the cylindrical top chamber, or some may be supplied before and some after. This is a fine, gentle spray which is largely suspended in the gases and carried to the Venturi tube by them. This mist is advantageously sprayed down into the gases, although it may be directed horizontally into them or supplied at any angle. The mist collects on the articles suspended in the gas and makes them more readily separated by the wash spray.

The sprays may be water sprays or they may be constituted of an organic liquid.

The sprays will remove solid and liquid particles, and possibly also a gas from a gas stream, as, for example, when water is sprayed into blast furnace gases to remove both suspended ash and sulfur dioxide, etc.

The invention is further described in connection with ths accompanying drawings, in which—

Figure 1:
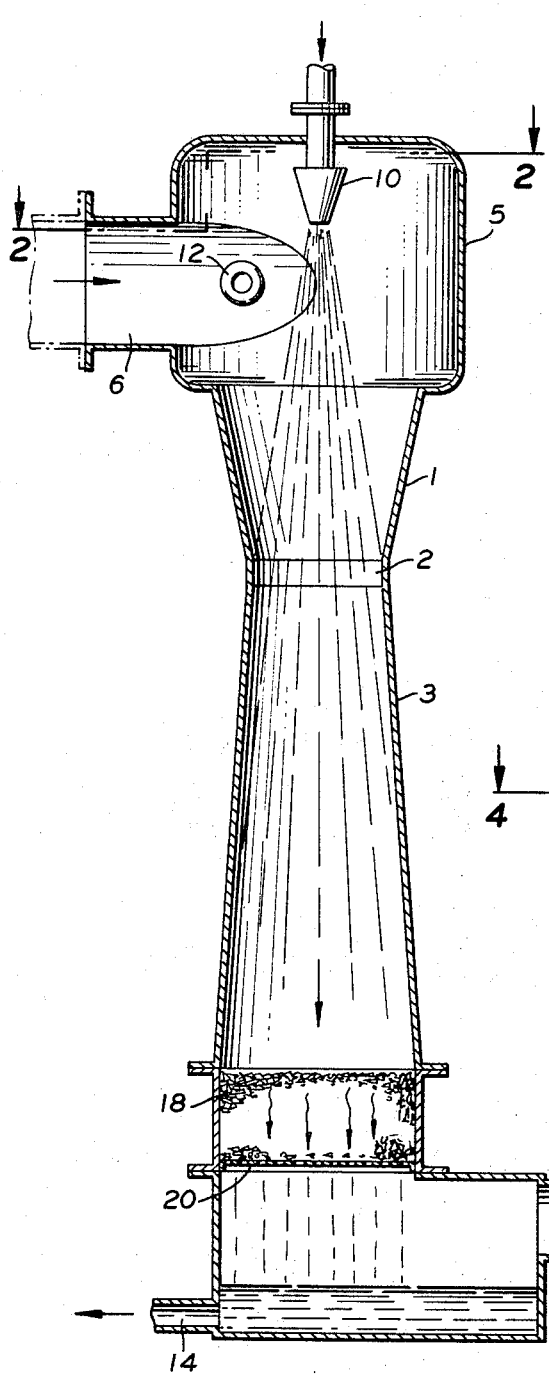
FIGURE 1 is a vertical section through a Venturi-tube scrubber with a central wash spray and a single mist spray.
Figure 2:
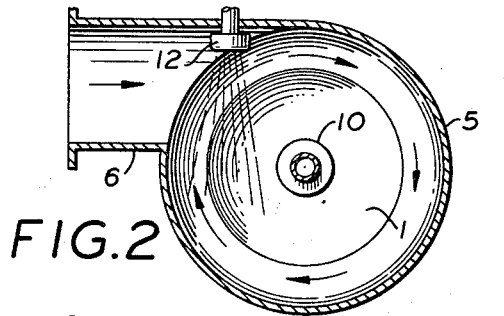
FIGURE 2 is a section on the line 2—2 of FIGURE 1.
Figure 4:
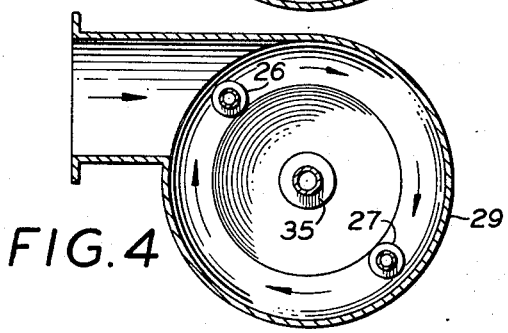
FIGURE 4 is a section on the line 4—4 of FIGURE 3.

Each tower comprises a Venturi tube with a downwardly converging upper portion 1, a narrow restriction or throat 2 between the upper and lower portions, and a widening lower portion 3. At the top of the Venturi tube is a cylindrical chamber 5 which is usually concentric with the Venturi tube.

The gas enters the chamber 5 tangentially through conduit 6 and it then swirls down into the Venturi tube. This prevents the collection of any substantial amount of solid matter on the walls.

The gas, just before it is washed by the spray from the nozzle 10 is sprayed with a mist which collects on the entrained particles and tends to agglomerate them. This mist is sprayed into the gas within the chamber 5 or just as it enters this chamber. FIGURE 1 shows a single nozzle 12 directed across the stream of the gas. The mist from this nozzle is entrained in the gas in its turbulent flow around the chamber 5 and then down into the Venturi tube. The mist collects on the entrained particles and, at least to some extent, agglomerates them so that they are more readily contacted by the forceful spray from the nozzle 10.

The Venturi tube causes turbulence in the gas stream, and this is intensified by changing the direction of flow of the stream by causing it to first swirl around in the chamber 5 and then flow helically down into the Venturi tube. This turbulence brings most of the spray-coated particles into contact with the wash spray which leaves the nozzle 10 with considerable force. The particles contacted by this spray are no longer suspended in the gas stream, but are separated from it and are in the wash water which collects in the bottom of the tower and is removed through the drain 14. The cleaned gases leave through the outlet 15.

To insure intimate contact between the particles and the spray, a bed of packing elements 18 is supported on support plate 20 in the bottom of the tower. The bed of packing elements is optional. It not only assists in making contact between the entrained particles and the wash spray, but it also removes particles of the spray from the gas stream.

Figure 3:
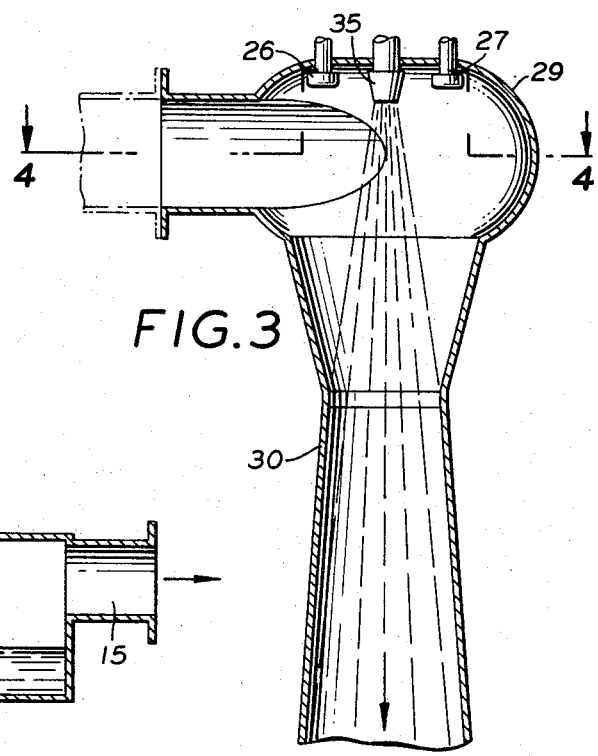
FIGURE 3 is a vertical section through a modified scrubber in which an additional mist spray is provided.

In the modification shown in FIGURE 3, mist sprays 26 and 27 are located in the chamber 29 above the Venturi tube 30. Mist from the spray 26 is introduced into the entering gases and further mist is introduced through the spray 27. The wash spray, which is a forceful spray, is introduced through the nozzle 35. The gases enter tangentially and swirl over the wall of chamber 29 and then down through the tube. There is great turbulence as they converge into the Venturi tube and are directed through its throat.

Tests were made in apparatus similar to that shown in FIGURE 1, with and without a bed of packing elements below the Venturi tube. A dust of feldspar particles was entrained in the gas, and water was used for washing. Using only the wash spray, 96.1 percent of the feldspar particles were removed; when mist was first introduced into the spray, the efficiency was increased to 98.7 percent. Although this is an increase of only 2.6 percent in the efficiency, it means that 66 percent of the dust not removed by the spray 10 alone, was removed. By providing a bed of packing elements in the bottom of the tower, the efficiency was increased to 100 percent. A slight dust was visible, but not enough to be detected by the Gelman filter test which was employed.

The invention is covered in the claims which follow.

I claim:
1. In a gas scrubber of the Venturi type comprising a vertical, hollow tower having at its top an inlet chamber defined by a generally cylindrical wall, and in successive decending order, an inverted frusto-conical section, a Venturi section and an upright frusto-conical section and gas inlet means tangentially communicating with the cylindrical wall defining said inlet chamber, the improvement comprising the combination of (a) a mist spray nozzle positioned at the point of juncture of said gas inlet means with the cylindrical wall defining said chamber and directed to emit a spray generally at right angles to the direction of flow of gas into said inlet chamber, and (b) a main spray nozzle depending from the top of said inlet chamber and positioned to launch a spray from a point above the gas flowing into said chamber.

2. The gas scrubber as defined in claim 1 wherein said upright frusto-conical section communicates with a packed bed which in turn communicates with gas and liquid outlet means.

References Cited

UNITED STATES PATENTS

| | | | |
|---|---|---|---|
| 1,894,696 | 1/1933 | Lindemann | 261—116 |
| 2,200,891 | 5/1940 | Nyborg. | |
| 2,484,277 | 10/1949 | Fisher | 261—116 XR |
| 3,177,634 | 4/1965 | Latham et al. | 261—116 XR |
| 3,186,146 | 6/1965 | Latham | 261—79 XR |
| 3,210,914 | 10/1965 | Eckert | 261—117 XR |

FOREIGN PATENTS 1,062,143  12/1953  France.

HARRY B. THORNTON, *Primary Examiner.*

E. H. RENNER, *Assistant Examiner.*